United States Patent [19]
Deason et al.

[11] Patent Number: 5,231,468
[45] Date of Patent: Jul. 27, 1993

[54] BEAM SHUTTERING INTERFEROMETER AND METHOD

[75] Inventors: Vance A. Deason; Gordon D. Lassahn, both of Idaho Falls, Id.

[73] Assignee: EG&G Idaho, Inc., Idaho Falls, Id.

[21] Appl. No.: 788,395

[22] Filed: Nov. 6, 1991

[51] Int. Cl.⁵ .................................. G01B 11/24
[52] U.S. Cl. ........................... 356/359; 356/358; 356/351; 382/43
[58] Field of Search .............. 356/359, 358, 351; 382/43

[56] References Cited

U.S. PATENT DOCUMENTS

| | | |
|---|---|---|
| 4,030,831 | 6/1977 | Gowrinathan .................. 356/109 |
| 4,379,633 | 4/1983 | Bickel et al. ..................... 356/359 |
| 4,422,764 | 12/1983 | Eastman .......................... 356/357 |
| 4,480,916 | 11/1984 | Baretet et al. .................... 356/351 |
| 4,639,139 | 1/1987 | Wyant et al. ..................... 356/359 |
| 4,832,489 | 5/1989 | Wyant et al. ..................... 356/359 |
| 4,850,693 | 7/1989 | Deason et al. ................... 356/35.5 |
| 4,869,593 | 9/1989 | Biegen ............................. 356/359 |
| 4,872,775 | 10/1989 | Kuchel ............................. 356/360 |
| 5,112,129 | 5/1992 | Davidson et al. ................ 356/359 |

Primary Examiner—Samuel A. Turner
Assistant Examiner—LaCharles Keesee
Attorney, Agent, or Firm—Alan D. Kirsch

[57] ABSTRACT

A method and apparatus resulting in the simplification of phase shifting interferometry by eliminating the requirement to know the phase shift between interferograms or to keep the phase shift between interferograms constant. The present invention provides a simple, inexpensive means to shutter each independent beam of the interferometer in order to facilitate the data acquisition requirements for optical interferometry and phase shifting interferometry. By eliminating the requirement to know the phase shift between interferograms or to keep the phase shift constant, a simple, economical means and apparatus for performing the technique of phase shifting interferometry is provide which, by thermally expanding a fiber optical cable changes the optical path distance of one incident beam relative to another.

16 Claims, 5 Drawing Sheets

BEAM SHUTTERING INTERFEROMETER AND METHOD

CONTRACTUAL ORIGIN OF THE INVENTION

The United States Government has rights in this invention pursuant to Contract No. DE-AC07-76ID01570 between the U.S. Department of Energy and EG&G Idaho, Inc.

BACKGROUND OF THE INVENTION

The present invention relates to an interferometer and method and more particularly to a method and apparatus for performing phase shifting interferometry and data reduction.

Phase shifting interferometry (PSI) is known in the art and involves acquiring a sequence of interferograms, where between interferograms, the phase of one incident beam of the interferometer has been shifted by some fraction of a wavelength relative to another incident beam. Well-known advantages of the PSI include (1) high measurement accuracy, (2) rapid measurement, (3) good results even with low contrast fringes, (4) results independent of intensity variations across the pupil, and (5) phase obtained at a fixed grid of data points. In PSI the phase difference between the two interfering beams is varied in a known manner, and measurements are made of the intensity distribution of the interfering beams. The technique of phase shifting may be accomplished by several different approaches, including, the use of a rotating waveplate, a piezoelectric transducer driven mirror, moving gratings, acoustooptic modulators or Zeeman split lasers. These phase shifting techniques require precisely calibrated, sophisticated opto-mechanical devices and control systems so that the phase shifts between interferograms are either known or constant.

Several algorithms are known which use the intensities of the various interferograms at each point to solve for the phase at that point. With conventional algorithms and techniques, the size of the phase shift must either be known, or it must be known that all of the phase shifts are exactly the same. While there are many interferometry techniques that utilize phase shifting, each consists of solving a set of linear equations at each pixel of the interferogram. The set of equations is generated by acquiring an interferogram for each equation, with a known or constant phase shift, $\Delta$, between successive interferograms.

The basic equation for interferometry is:

$$I_{(i,j)} = I_{A(i,j)} + I_{B(i,j)} + 2[I_{A(i,j)}I_{B(i,j)}]^{\frac{1}{2}}\cos[\Phi_{(i,j)}] \quad (1)$$

where i and j define pixel locations on the image plane, $I_A$ and $I_B$ are the intensities of the reference and object beams at pixel location (i,j), and $\Phi$ is the relative optical phase of the two beams at that location. Phase $\Phi$ is the final data desired in all interferometric experiments. It is the phase which is used to calculate related physical parameters such as density, pressure, temperature, and displacement.

The complete set of equations for k−1 phase shifts (k interferograms) is:

$$I_{k(i,j)} = I_{A(i,j)} + I_{B(i,j)} + 2[I_{A(i,j)}I_{B(i,j)}]^{\frac{1}{2}}\cos[\Phi_{(i,j)} + \Delta_1] \quad (2)$$

-continued
$$I_{k(i,j)} = I_{A(i,j)} + I_{B(i,j)} + 2[I_{A(i,j)}I_{B(i,j)}]^{\frac{1}{2}}\cos[\Phi_{(i,j)} + \Delta_k]$$

where $\Delta_k$ is the phase shift for interferogram k.

One can then solve this set of equations at each point of the interferogram for $I_A$, $I_B$ and $\Phi$ with 3 equations, given a known phase shift, or with four equations if the phase shift is unknown, but constant. Various algorithms are known which permit further statistical certainty by using more phase shifted interferograms. If the phase shift varies in an unknown manner, each additional interferogram simply generates one more equation and one more unknown. One must usually also assume that the independent incident beam intensities are constant throughout this process of data acquisition.

In the typical two-beam interferogram, the beams which interfere contain various types of non-uniformities which are either constant or varying in time. Constant intensity variations are represented by the Gaussian intensity profile of ideal laser beams, or perhaps by deviation from the ideal caused by dust and imperfections in or on the optical components which form the beams. These might be referred to as "fixed pattern noise". Time varying intensity patterns, on the other hand, might be due to variations in laser power, dust particles moving through the beams, variations in the index of refraction of the air through which the beam moves, or various statistical noise sources in the laser or recording media. These noise sources are generally controlled by time averaging, where the interferogram is recorded over an extended time period, during which, the time varying effects may be averaged out. In order to minimize the effects of these non-uniformities in the interfering beams, and thereby enhance the data quality, elaborate and precise optical configurations are required. These elaborate optical configurations are expensive and require experienced operators performing under very meticulously controlled conditions.

It is an object of this invention to provide a noise reduction method which simplifies interferometric data reduction.

It is another object of this invention to provide a beam shuttered phase shifting interferometry method to facilitate the technique of phase shifting interferometry.

It is a further object of this invention to provide a phase shifting interferometer which facilitates interferometry data reduction and requires minimum operator intervention.

It is still a further object of this invention to provide a novel apparatus for performing phase shifting interferometry that does not require expensive and sophisticated hardware for controlling the phase shifting process.

Additional objects, advantages and novel features of the invention will become apparent to those skilled in the art upon examination of the following and by practice of the invention.

SUMMARY OF THE INVENTION

To achieve the foregoing and other objects, this invention comprises a novel method and device that results in the simplification of phase shifting interferometry by eliminating the requirement to know the phase shift between interferograms or to keep the phase shift between interferograms constant. By separately shuttering each independent beam and thereby knowing the intensity of each independent beam, it is possible to calculate the phase difference between interferograms. The present invention provides a simple, inexpensive means to shutter each independent beam in order to facilitate the data acquisition for phase shifting interferometry. Beam shuttering also provides a methodology for noise reduction in interferometry not involving phase shifting. The present invention also provides a simple, economical means and apparatus for performing the technique of phase shifting interferometry by utilizing the thermal expansion properties of a fiber optical cable to change the optical path distance of one incident beam relative to another incident beam.

BRIEF DESCRIPTION OF THE DRAWINGS

For purposes of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
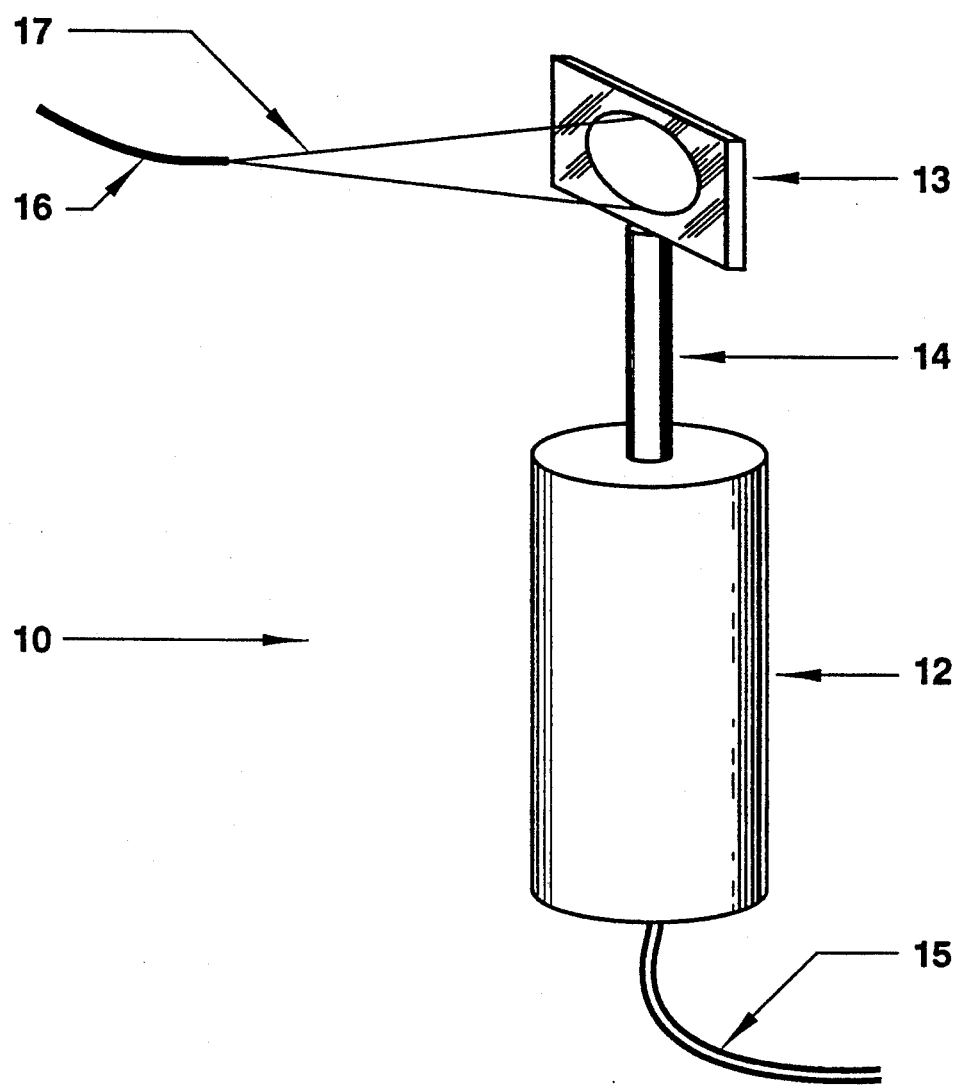
FIG. 1 is a drawing of the electro-mechanical mechanism for performing the beam shuttering method of the present invention.

The beam shuttering method and apparatus of the present invention provides a means for performing phase shifted interferometry without the requirement of maintaining known or constant phase shifts between interferograms. Beam shuttering further provides a method for interferometry data reduction by making a simple, inexpensive modification to a multiple independent beam interferometer. Types of multiple independent beam interferometers to which the beam shuttering technique may be applied include, among others, Michelson interferometers, Twyman-Green interferometers, Speckle interferometers, Mach-Zender interferometers, and holographic interferometers. Essentially, any interferometer having at least two independent beams can utilize the beam shuttering device and technique to perform either classical interferometry or to augment the technique of phase shifting interferometry without elaborate, intricate and precision calibrated equipment. Beam shuttering refers to collecting additional data on the reference and object beam intensity distribution by recording images of each independent beam's intensity. To perform this method with an interferometer having two independent beams, the following procedure is used. The reference beam is shuttered, or blocked, while the object beam remains unobstructed and the image of the object beam is recorded, usually with a video camera connected to a computerized digitizing system. Next, the object beam is shuttered and the reference beam is unblocked, and then the image of the reference beam is recorded in a similar manner. These two images are $I_A$ and $I_B$ of Equation (1). Multiple images of the reference and objects beams can be taken and averaged to alleviate rapidly fluctuating noise due to, among other things, video amplifiers and digitizing circuits. Finally, both beams are unbloxked and an image of the combined interferometric beam pattern is recorded.

Equation (1) can be rewritten in the form:

$$Cos(\Phi_{(i,j)}) = [I_{(i,j)} - I_{A(i,j)} - I_{B(i,j)}]/2[I_{A(i,j)} \cdot I_{B(i,j)}]^{\frac{1}{2}} \qquad (3)$$

and solved for $\Phi_{(i,j)}$. Equation (3) shows how pure interferometric phase information can be extracted from data containing considerable fixed pattern noise. Multiple interference patterns can be recorded and analyzed and the results averaged on a pixel-by-pixel basis to improve the statistical reliability of the data.

For phase shifting interferometry, the required number, usually at least three, of phase shifted fringe images are recorded in addition to recording the intensities of the independent beams. Of course, for interferometers having more than two independent beams, additional shuttered images will be required.

The shuttered beam images are much more stable in real time than are the fringe images, which allows for time averaging to reduce random noise in the shuttered images. Beam shuttering does require that some hardware be available to separately block the reference and object beams. Such hardware is, however, much simpler than precision phase shifting devices that currently exist in the art.

In the preferred embodiment of the present invention, a multiple independent beam interferometer is converted into a beam shuttered interferometer by introducing an electro-mechanical shuttering mechanism between the specimen under observation and each of the output optical fiber tips. The most convenient place to position the electro-mechanical shuttering mechanism is near the fiber tip, due to the small size of the exit beams, which therefore permits the use of a minimal shutter size. FIG. 1 shows an embodiment of an electro-mechanical shuttering mechanism 10. As depicted in FIG. 1, an electrically actuated linear solenoid 12 moves a shutter blade 13 that is connected to a spring loaded shaft 14 into a light beam path when power is applied to the solenoid 12. In FIG. 1 the light beam path 17 is a laser beam having exited a optical fiber. Activation of the solenoid 12 is controlled via a control cable 15 which, in the preferred embodiment, is activated by a computer (not shown) generated control signal. The computer controls the timing and sequencing of the phase shifting process as well as the data acquisition for all interferograms. The control means must have the capability of independently covering each of the beams, and of leaving both beams unobstructed.

Figure 2:
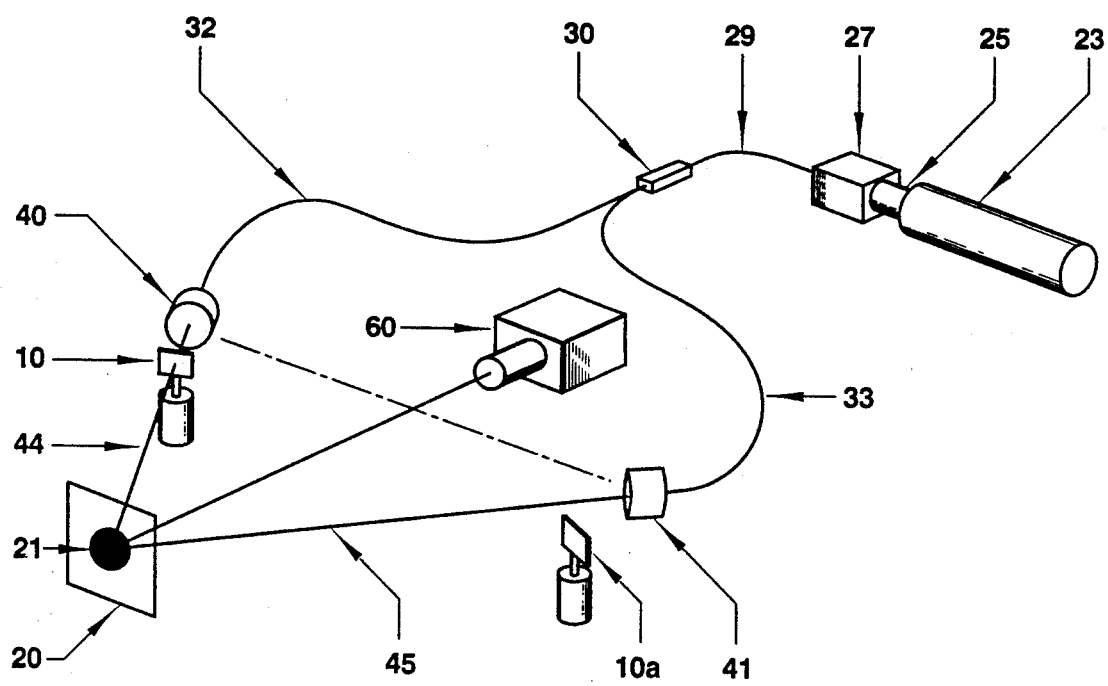
FIG. 2 is a block diagram of a preferred embodiment of the beam shuttering device using the Compact Portable Diffraction Moiré Interferometer of Deason et al., U.S. Pat. No. 4,850,693.

FIG. 2 shows a schematic diagram of a preferred embodiment of the present invention using the Compact Portable Diffraction Moiré Interferometer of Deason et al., U.S. Pat. No. 4,850,693. The operation of the present invention in the Deason et al. interferometer is rather straightforward and requires minimal modifications in the structural configuration. As depicted in FIG. 2, a laser 23 directs a laser beam through a laser beam expander 25 to a fiber optic coupler 27. The signal passes through an optical fiber 29, is then split by an evanescent wave fiber optic beam splitter 30 and the resulting two independent beams pass respectively through optical fiber 32 to collimating lens 40 and through optical fiber 33 to collimating lens 41. As depicted in FIG. 1 beam shuttering devices 10 and 10a are positioned in the path of incident beams 44 and 45 respectively, to provide the means to block, or shutter each beam separately. Incident beam 44 and incident beam 45 are directed onto the specimen 20 and the diffraction grating 21. The intensity image of incident beam 44 is recorded by an imaging device 60 while incident beam 45 is shuttered. Then the intensity image of incident beam 45 is recorded by the imaging device 60 while incident beam 44 is shuttered. Finally, phase shifted interferograms are recorded of the interference patterns between the two incident beams which are also viewed by an imaging device 60. These series of interferograms provide the necessary data for fringe analysis.

The shuttered beam data for any one pixel (e.g. pixel 1) gives $$\Phi_1 + \Delta_k = S_{l,k} C_{l,k} \tag{4}$$

for each k (with $\Delta_1 = 0$), where C is the arccosine value obtained after solving Equation (1) for the cosine term and S is either 1 or $-1$. The symbol k in Equation (4) represents the number of interferograms recorded during the phase shifting process. Apart from the sign ambiguity represented by the S term, Equation (4) represents k equations in k unknowns: $\Phi_1$ and $(k-1) \Delta_k$. To remove the sign ambiguity, a second pixel is selected which is phase shifted roughly 90 degrees from the first pixel, and the following equations are written:

$$\Phi_2 - \Phi_1 = S_{2,k} C_{2,k} - S_{l,k} C_{l,k} \tag{5}$$

which can be regarded as an over specified (i.e., too many equations) system of equations for the difference $\Phi_2 - \Phi_1$. This set of equations is solved in the least squares sense. The solution is done separately for each possible combination of signs $S_{l,k}$ and $S_{2,k}$. The sign combination which gives the smallest residual error in the least squares solution is regarded as the correct choice of signs to be used in Equation (5). Then Equations (5) can be solved directly for the $\Delta_k$ values. This process is repeated for several (perhaps 100) pairs of pixels from different parts of the interferogram to get several independent estimates of the $\Delta_k$ values which can be averaged to reduce random noise effects.

Another method for calculating the phase shifts $\Delta_k$ is to have the operator, during data analysis, specify a straight line segment on the images such that the line spans approximately one full fringe cycle in a region where the phase $\Phi$ is approximately a linear function of position. The fringe that is spanned should be fairly broad and contain relatively little noise in the raw data. Then let s be the position along this line, and let $\Phi$ along the line be specified by a polynomial approximation:

$$\Phi + \Phi(S=0) + \Phi(S) \tag{6}$$

where $\Phi(S=0)$ is the phase $\Phi$ at one end of the line and $$\Phi(s) = \alpha_1 s + \alpha_2 s^2 + \ldots \alpha_m s^m + \ldots \alpha_M s^M \tag{7}$$

where m+1, 2, ... M. The number of terms M is specified beforehand to be some low value such as 2. The terms $\alpha_m$ are to be determined. As a first estimate, $\alpha_1$ is simply $2\pi$ divided by the line length and the other $\alpha_m$ terms are zero. For fringe image k, the intensity along the selected line can be written as:

$$I_k(s) = A + B\cos(\Phi(s) + \Delta_k) = A + B\cos(\Phi(s) + \Delta_k) \tag{8}$$

where $\Delta_k = \Delta_k + \Phi(s=0)$. It is assumed that the number of pixels along the specified line segment is greater then k+m. Then using a non-linear least squares fitting procedure, $\Delta_k$ and $\alpha_m$ can be determined. This requires first estimates for the $\alpha_m$ as stated above, and for the $\Delta_k$ terms, which are obtained as follows:

$$\int I_k \cos(\Phi(s)) \alpha_1 ds = \int I_k \cos(\Phi) d\Phi = B\cos(\Delta_k)/2 \tag{9}$$

and $$\int I_k \sin(\Phi(s)) \alpha_1 ds = \int I_k \sin(\Phi) d\Phi = -B\sin(\Delta_k)/2 \tag{10}$$

assuming that $\Phi(s) = \alpha_1 s$ and the line segment is one cycle long. The integral can of course be approximated by sums over the pixels in the line segment, which then allows the first estimate $$\Delta_k = -\text{atan2}(sumsin, sumcos). \tag{11}$$

After these first estimates are obtained, better values for the $\Delta_k$ and the $\alpha_m$ can be obtained using the iterative, non-linear least squares fitting procedure. Finally, the following transformation is written:

$$\Delta_k = \Delta_k - \Delta_1 \tag{12}$$

This derivation assumes that A and B, and hence the shuttered beam intensities $I_A$ and $I_B$, are independent of s for all the pixels in the specified line segment. This is normally a reasonable approximation, however, the shuttered image data ensures that A and B are constant as required. The calculated scaled intensities $$J_k = (I_k - I_A - I_B)/2(I_A I_B)^{\frac{1}{2}} \tag{13}$$

are used instead of the raw intensities in the fringe analysis procedure.

Figure 3:
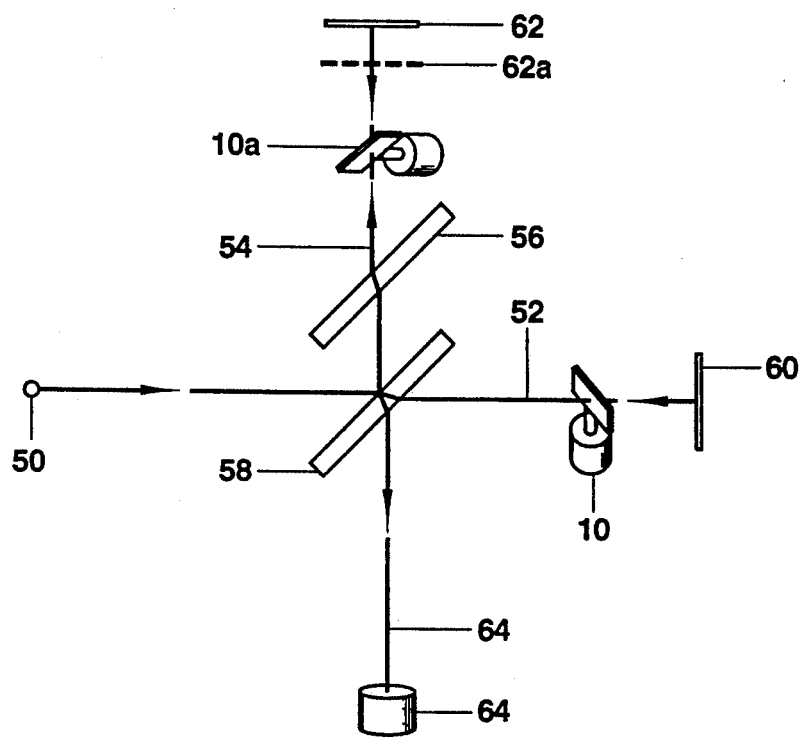
FIG. 3 is a schematic diagram of a preferred embodiment of the beam shuttering device using a Michelson type interferometer.

FIG. 3 shows the preferred embodiment of the present invention in a Michelson type interferometer. As shown in FIG. 3, light form a source 50 is divided into two beams 52 and 54 with nearly equal amplitudes at beam splitter glass plate 58 which has a semi-reflecting coating on one surface of the parallel planes. Since in the Michelson interferometer beam 54 traverses the beam splitter 58 only once, while beam 52 will traverse it three times, a compensating plate 56 of the same material and having the same thickness as beam splitter 58 is introduced in the beam 54 path. Beams 52 and 54 are reflected back at two mirrors, 60 and 62 respectively, and return to glass plate 58 where they are recombined and emerge as beam 64 which is recorded by imaging device 65. In the Michelson interferometer, the phase shifting technique is accomplished by moving mirror 62 to the position shown in FIG. 3 as mirror 62a. The beam shuttering technique in the Michelson interferometer is accomplished by placing the beam shuttering devices 10 and 10a in the pathways of beams 52 and 54, respectively. This Michelson configuration provides the independent beam intensities and a series of interferograms containing the necessary data for fringe analysis using the previously described algorithm.

Figure 4:
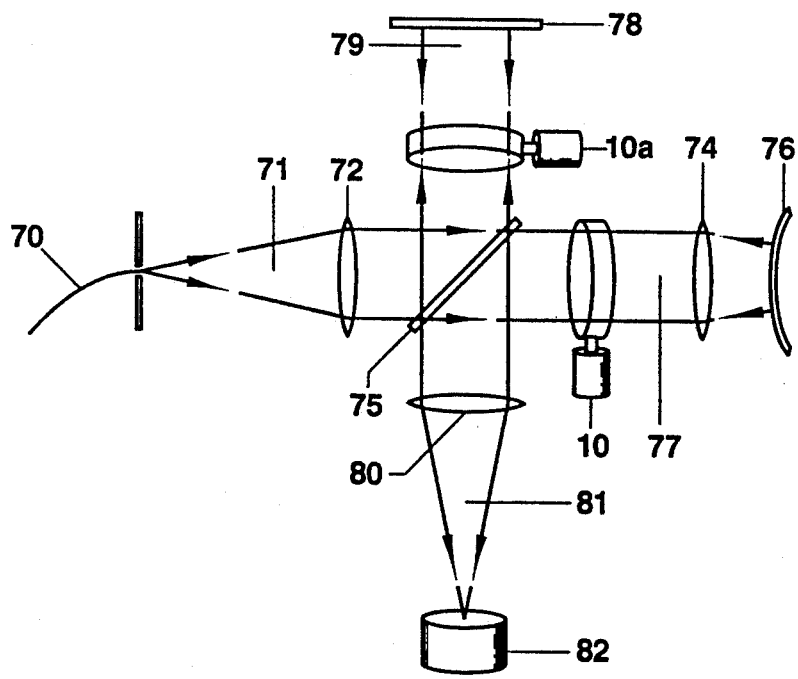
FIG. 4 is a schematic diagram of a preferred embodiment of the beam shuttering device using a Twyman-Green type interferometer.

FIG. 4 shows a preferred embodiment of the beam shuttering device in a Twyman-Green interferometer. The Twyman-Green interferometer is known in the art in which a Michelson interferometer is modified to use collimated light, so that fringes of equal thickness are obtained. The Twyman-Green optical arrangement of FIG. 4 is used to test the characteristics of lens 74. From a light source 70 a beam of light 71 freely expands to a collimating lens 72. The collimated beam of light is then divided into two collimated beams 77 and 79 by a beam splitter glass plate 75 having a semi-reflective coating on one surface of the parallel planes. The first collimated beam 77 passes through the beam shuttering device 10 then through the test lens 74 and is reflected by convex mirror 76. The second collimated beam 79 is reflected through beam shuttering device 10a and then reflected off mirror 78. Both reflected collimated beams are combined and focused by lens 80 into an interference beam 81 which is imaged by an imaging device 82. This Twyman-Green arrangement provides the independent beam intensities and a series of phase shifted interferograms containing the necessary data for fringe analysis using the previously described algorithm.

By eliminating the need for careful control of the phase shift, far simpler and less expensive devices can be used to introduce the phase shifts required for PSI. Additionally, slight errors in the phase shift, common to any phase shifter, can be automatically corrected using the above algorithms. One simple and inexpensive method for introducing the phase shift required for PSI is to utilize the thermal expansion properties of a fiber optical cable. Optical fibers are normally made of glass or fused silica, and like most materials, expand when heated. Fused silica has about an order of magnitude smaller coefficient of linear thermal expansion than glass and therefore is the preferred material. The thermal expansion of the fiber increases the optical path length in the fiber and thereby shifts the phase in that fiber relative to that in the other fiber or leg of the interferometer which is not heated.

Figure 5:
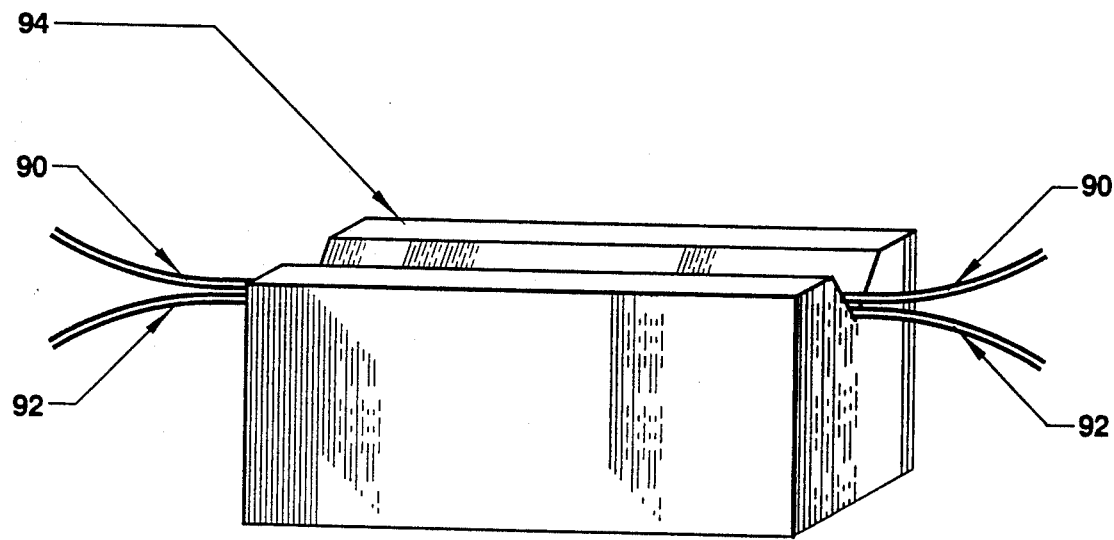
FIG. 5 is a drawing depicting the thermal phase shifting device of the present invention.

FIG. 5 illustrates an example of the configuration required for a thermal expansion phase shifter. A short portion (e.g., 50 mm) of optical fiber 90 and a heating wire 92 are placed in close proximity to each other. The heating wire can be any material having electrical resistance, such as nichrome. A current is passed through the heating wire 92 causing heat to be generated from the heating wire which is transmitted to the optical fiber 90 due to its close proximity to the heating wire 92. As the optical fiber becomes heated, linear expansion occurs thereby causing the optical path length of that fiber to increase. The other optical fiber (not shown) is not heated so that the relative phase between the two fibers is shifted. Applicants have observed that a temperature rise of 20° C. for fused silica and 2° C. for glass will cause a 50 mm length of fiber to elongate by about one wavelength (632.8 nm) for a HeNe laser beam. When the current is turned off, the fiber cools and the phase shift is reversed. In a preferred embodiment of the present invention, the close proximity of the heating wire 92 and optical fiber 90 occurs in a heat sink 94 which provides for the rapid dissipation of the heat. Preferably the heat sink 94 would consist of such materials as aluminum, brass, or copper, which have good heat dissipation characteristics. If a sequence of interferograms is recorded while the fiber is lengthening or shortening, then phase shifting algorithms can be used to analyze the interferograms and measure the phase of one beam relative to the other.

Figure 6:
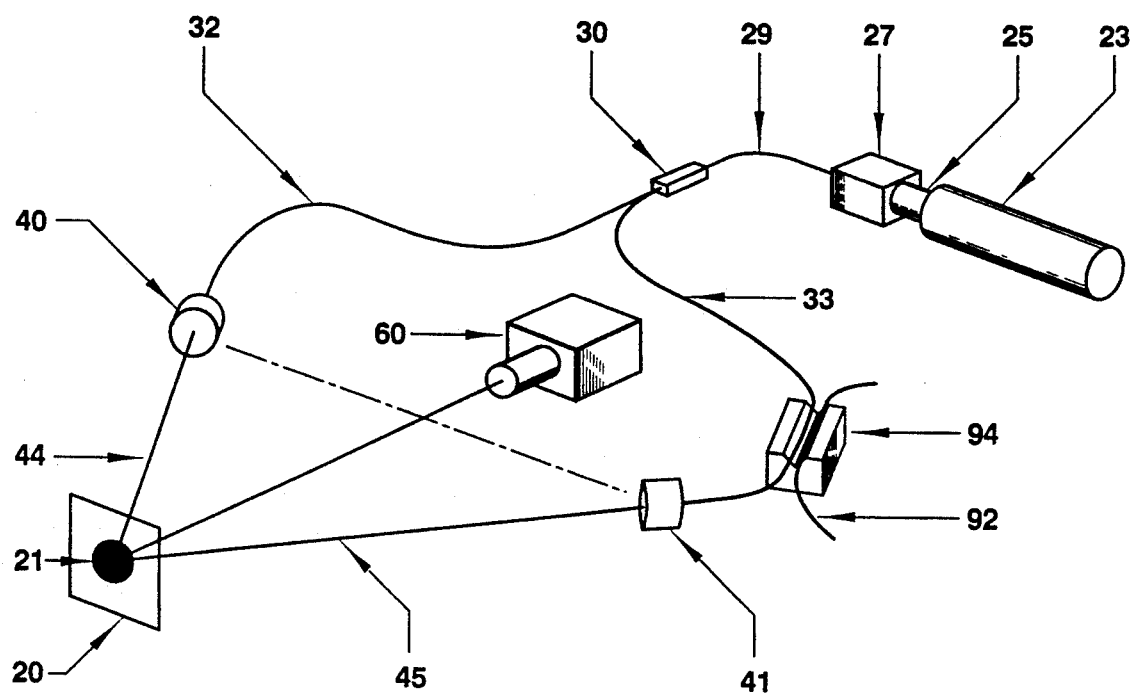
FIG. 6 is a block diagram showing the thermal phase shifting device in use with the Compact Portable Diffraction Moiré Interferometer of Deason et al., U.S. Pat. No. 4,850,693.

Referring now to FIG. 6, where like elements are given like numbers to that of FIG. 2, an illustration of a thermal phase shifting device in use with the Compact Portable Diffraction Moiré Interferometer of Deason et al. One fiber optical cable 33 is positioned in close proximity to heating wire 92 within the heat sink 94. Such an interferometry system could be manually controlled or it could be controlled by means of a computer. Control of the system would include the control of the laser generation and imaging device as well as the phase shifting, including the thermal fiber optic phase shifting as described above. Data analysis would then be accomplished by means of the previously presented algorithms.

The foregoing description of a preferred embodiment of the invention has been presented for purposes of illustration and description. It is not intended to be exhaustive or to limit the invention to the precise form disclosed and obviously many other modifications are possible in light of the above teaching. The embodiments described explain the principles of the invention and practical application and enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A method for performing optical interferometry, the steps comprising:
    (a) providing at least a reference beam of light and an object beam of light;
    (b) shuttering said reference beam of light;
    (c) directing said object beam of light at a test specimen thereby illuminating said test specimen to provide a light intensity pattern of said object beam;
    (d) imaging and recording said object beam light intensity pattern;
    (e) shuttering said object beam of light;
    (f) directing said reference beam of light at said test specimen thereby illuminating said test specimen to provide a light intensity pattern of said reference beam;
    (g) imaging and recording said reference beam light intensity pattern emanating from said test specimen;
    (h) directing said reference beam of light and said object beam of light at said test specimen thereby illuminating said test specimen to provide an interference pattern;
    (i) imaging and recording said interference pattern;
    (j) computing the relative optical phase of the reference and object beams of light at each pixel location of said imaged interference pattern.

2. The method of claim 1 including repeating steps (b) through (d) a multiple number of times to alleviate time varying noise sources at each pixel location of said object beam intensity pattern.

3. The method of claim 1 including repeating steps (e) through (g) a multiple number of times to alleviate time varying noise sources at each pixel location of said reference beam intensity pattern.

4. The method of claim 1 including repeating steps (h) and (j) a multiple number of times to alleviate time varying noise sources at each pixel location of said imaged interference pattern.

5. The method of claim 1 having a multiplicity of independent object beams of light, said multiplicity of independent object beams and reference beam being shuttered so that the light intensity pattern of said reference beam and each independent object beam is imaged and recorded and used to calculate the relative phase between the reference beam and the independent object beams.

6. The method of claim 1 wherein said reference and object beams of light are provided by a laser.

7. The method of claims 1 or 5 wherein the phase of said reference beam is shifted relative to the phase of said object beam and a series of phase shifted interferograms are imaged and recorded.

8. The method of claim 6 wherein said relative optical phase shift is computed by determining the phase at each pixel location along a specified line through the phase shifted interferogram using an iterative, nonlinear least squares fitting procedure and said recorded intensities of the reference and object beams of light.

9. An optical interferometer comprising:
  means for providing a reference beam of light and an object beam of light;
  means for providing independent pathways for said reference beam of light and said object beam of light to illuminate a test specimen;
  means for obstructing the pathway of said reference beam of light while not impeding the pathway of said object beam of light, thereby permitting said object beam of light to illuminate said test specimen;
  means for imaging and recording the intensity of said object beam light illuminating said test specimen;
  means for obstructing the pathway of said object beam of light while not impeding the pathway of said reference beam of light, thereby permitting said reference beam of light to illuminate said test specimen;
  means for imaging and recording the intensity of said reference beam of light illuminating said test specimen;
  means for illuminating said test surface by said reference beam of light and said object beam of light thereby providing an interference pattern emanating from said test specimen;
  means of imaging and recording the said interference pattern of said reference beam of light and said object beam of light;
  means for computing the relative optical phase between said reference beam of light and said object beam of light using the recorded intensities of said reference beam and said object beam and the recorded interference pattern of said reference beam and said object beam.

10. The interferometer of claim 8 wherein said means for obstructing said reference and object beam pathways is by an electro-mechanical shuttering mechanism.

11. The interferometer of claim 8 wherein a computer is used to control the obstruction of the reference and object beam pathways and the recording of intensity and interference patterns.

12. The interferometer of claims 8 or 9 further comprising means for shifting the phase of the object beam relative to the phase of the reference beam thereby providing a plurality of phase shifted interferograms.

13. The interferometer of claim 11 wherein a portion of the pathway of said reference beam of light and said object beam of light consists of independent optical fibers.

14. The interferometer of claim 12 wherein said means for shifting said object beam phase relative to said reference beam phase consists of positioning said object beam optical fiber in close proximity to an electrically heated conductor, said conductor when electrically charged thermally expanding said object beam optical fiber thereby changing the optical path length of said object beam relative to said reference beam.

15. The interferometer of claim 12 wherein said object beam optical fiber and said electrically chargeable conductor are in close proximity within a heat sink, said heat sink providing means for dissipating heat generated by said electrically charged conductor.

16. The interferometer of claim 13 wherein said heat sink consists of an aluminum, copper or brass material.

* * * * *